United States Patent
Laksono et al.

(10) Patent No.: US 9,471,995 B2
(45) Date of Patent: Oct. 18, 2016

(54) CODEC ENGINE WITH INLINE IMAGE PROCESSING

(71) Applicant: VIXS SYSTEMS INC., Toronto (CA)

(72) Inventors: Indra Laksono, Richmond Hill (CA); Eric Young, Markham (CA); Chun-Chin Yeh, Markham (CA)

(73) Assignee: VIXS Systems Inc., Toronto (CA)

( * ) Notice: Subject to any disclaimer, the term of this patent is extended or adjusted under 35 U.S.C. 154(b) by 64 days.

(21) Appl. No.: 14/154,292

(22) Filed: Jan. 14, 2014

(65) Prior Publication Data

US 2015/0199789 A1 Jul. 16, 2015

(51) Int. Cl.
| | |
|---|---|
| *G06T 9/00* | (2006.01) |
| *H04N 7/01* | (2006.01) |
| *G09G 5/39* | (2006.01) |
| *G09G 5/36* | (2006.01) |
| *G09G 5/393* | (2006.01) |
| *H04N 19/44* | (2014.01) |
| *H04N 19/42* | (2014.01) |
| *H04N 19/85* | (2014.01) |
| *H04N 19/40* | (2014.01) |
| *H04N 19/59* | (2014.01) |

(52) U.S. Cl.
CPC .................. *G06T 9/00* (2013.01); *G09G 5/363* (2013.01); *G09G 5/39* (2013.01); *G09G 5/393* (2013.01); *H04N 7/012* (2013.01); *H04N 19/42* (2014.11); *H04N 19/44* (2014.11); *H04N 19/85* (2014.11); *G09G 2320/0261* (2013.01); *G09G 2340/02* (2013.01); *G09G 2350/00* (2013.01); *G09G 2360/08* (2013.01); *G09G 2360/121* (2013.01); *H04N 19/40* (2014.11); *H04N 19/59* (2014.11)

(58) Field of Classification Search
CPC ........ G06T 9/00; H04N 19/85; H04N 19/44; H04N 19/42; H04N 7/012; H04N 19/59; H04N 19/40; G09G 5/393; G09G 5/363; G09G 5/39; G09G 2360/08; G09G 2350/00; G09G 2320/0261; G09G 2340/02
See application file for complete search history.

(56) References Cited

U.S. PATENT DOCUMENTS

| | | | |
|---|---|---|---|
| 6,295,089 B1 * | 9/2001 | Hoang | 348/390.1 |
| 6,724,816 B1 * | 4/2004 | Kim et al. | 375/240.03 |
| 7,113,203 B1 * | 9/2006 | Wu et al. | 348/207.99 |
| 8,624,909 B2 | 1/2014 | Laksono | |
| 2006/0165181 A1 * | 7/2006 | Kwan et al. | 375/240.24 |
| 2007/0115294 A1 * | 5/2007 | Laksono | 345/582 |
| 2009/0304088 A1 * | 12/2009 | Kodaka | 375/240.25 |
| 2012/0170667 A1 * | 7/2012 | Girardeau et al. | 375/240.25 |
| 2013/0298026 A1 * | 11/2013 | Fitzpatrick | G11B 27/034 715/723 |
| 2014/0355671 A1 * | 12/2014 | Peng | H04N 19/115 375/240.03 |

* cited by examiner

*Primary Examiner* — Maurice L McDowell, Jr.

(57) ABSTRACT

A video device includes a codec engine to process video data to generate a stream of pixel blocks representing a picture of a sequence of pictures represented by the video data, an image processing module to receive the stream of pixel blocks via a local path between the codec engine and the image processing module and to perform at least one image processing function for the picture using pixel blocks of the stream of pixel blocks received via the local path to generate image processing result data representative of the picture. The video device further includes a storage interface coupleable to a storage component, the storage interface to provide the image processing result data for storage at the storage component.

8 Claims, 4 Drawing Sheets

CODEC ENGINE WITH INLINE IMAGE PROCESSING

FIELD OF THE DISCLOSURE

The present disclosure generally relates to video systems and more particularly to video encoding/decoding systems and image processing systems.

BACKGROUND

Many video systems employ image processing capabilities, such as scaling, deinterlacing, and the like, for video processed by the video system. Typically, a video processing system encodes, decodes, or transcodes the video data and stores the resulting video data in system memory. The video data is then subsequently accessed from the system memory for image processing. This approach thus consumes considerable memory bandwidth as the video data is pulled from the system memory for processing, as well as introduces considerable latency in completing the image processing.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
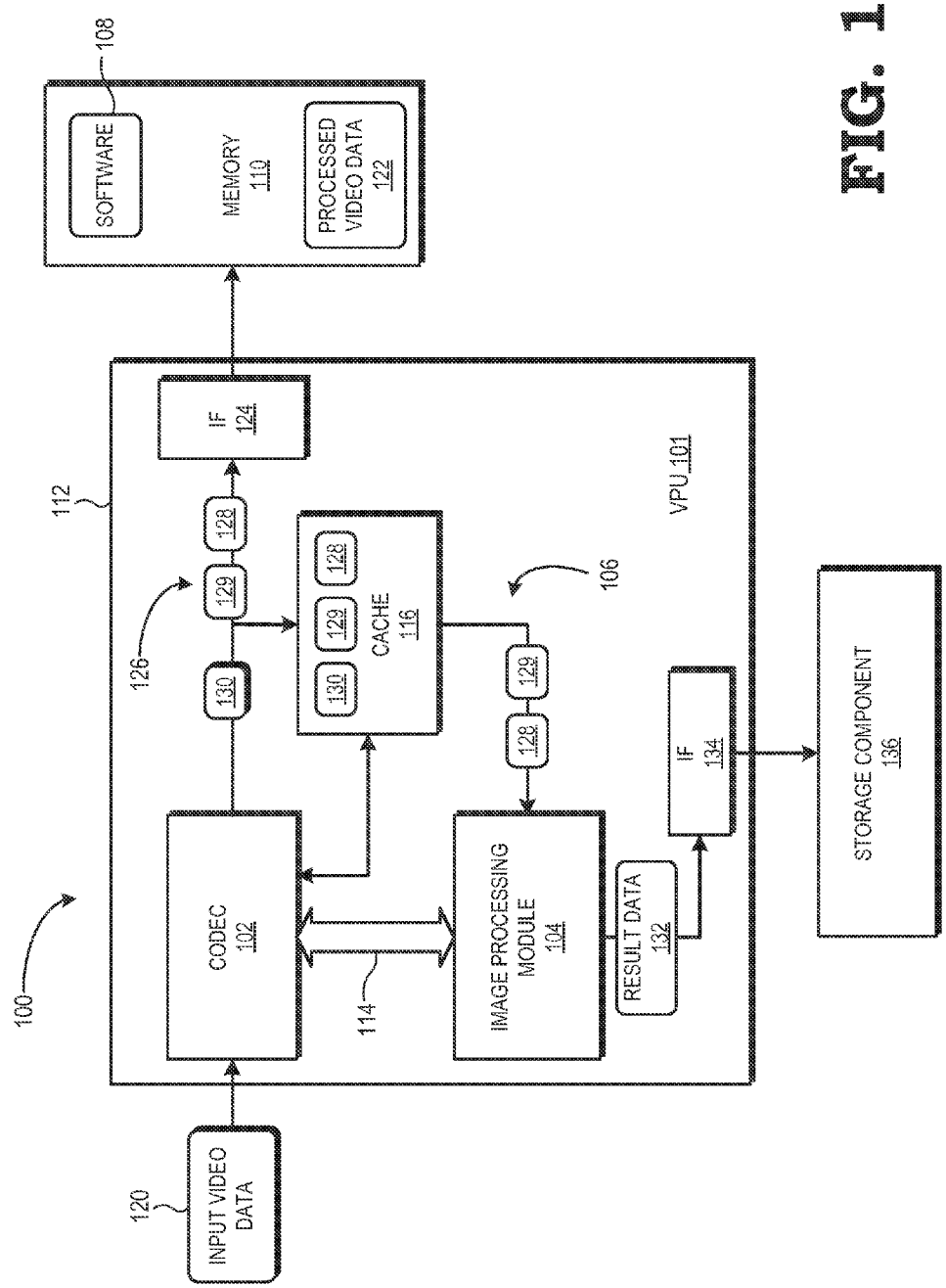
FIG. 1 is a block diagram of a video system providing inline image processing in accordance with at least one embodiment of the present disclosure.

FIGS. 1-4 illustrate example techniques for performing one or more image processing functions on video data as it is being encoded, decoded, or transcoded at a video processing unit. While a picture in a sequence of pictures of a video stream is being processed by a coding/decoding (codec) engine, at some point blocks of pixels (hereinafter, "pixel blocks") of the picture are generated or otherwise processed by a component of the codec engine. For decoding operations, encoded video data is decoded to generate a stream of sets of pixel blocks, whereby each set of pixel blocks together represents a corresponding picture of the sequence of pictures. For encoding operations, each picture of the sequence typically is deconstructed into a set of pixel blocks, which are then processed to generate resulting encoded picture. As disclosed herein, a video processing unit (VPU) takes advantage of the presence of these pixel blocks to perform one or more image processing functions using the pixel blocks as they are generated by the codec engine. In at least one embodiment, as pixel blocks are generated, the codec engine of the VPU provides the pixel blocks to an image processing module of the VPU via a local path of the VPU. The term "local path", as used herein, refers to a signaling path maintained exclusively within the die or integrated circuit (IC) package implementing the VPU. In implementations whereby the codec engine and the image processing module are implemented as separate hardware modules within the VPU, the local path can comprise an on-chip bus connecting the codec engine and the image processing module, a buffer, cache or other temporary storage component, or a combination thereof. In implementations whereby the codec engine and the image processing module are implemented as one or more processors of the VPU executing software, the local path can include a buffer, cache, or other storage component of the VPU that is accessible to both the codec software and the image processing software. The image processing module then may perform one or more image processing functions using the received pixel blocks to generate image processing result data for the picture, or for a set of pictures.

The image processing functions can include image modification functions that generate modified versions of the picture, such as scaling functions, deinterlacing functions, noise-reduction functions, rotation functions, image vectorization functions, gamma correction functions, and the like. In other embodiments, the image processing functions can include image analysis functions that generate image metadata describing one or more analyzed characteristics of the picture or a set of pictures. For example, an image analysis function can be performed to determine motion compensation metadata between a picture and a preceding picture. As other examples, image analysis functions can include facial feature detection processing for generating facial feature metadata, determination of the dominant color of each pixel block to generate dominant color metadata, and the like. The image processing result data, as metadata or a modified version of the picture, may be stored with the processed video data generated by the coded engine, or may be stored separately in a different storage component. The image processing result data then may be accessed and used by another component of the VPU or by another system in relation to the processed video data. For ease of reference, this technique of concurrent image processing while coding video data is referred to herein as "inline image processing" due to the inline integration of the image processing module with the codec engine.

By using the pixel blocks as they are generated by the codec engine and in a manner that does not require prior storage of the pixel blocks in an off-chip memory, the image processing module can more efficiently provide image processing capabilities than conventional image processing systems that operate on video data once it has been stored in off-chip memory, and thus requiring considerable memory bandwidth to access it from the off-chip memory. Moreover, in certain implementations the image processing functions can be performed on a pixel-block-by-pixel-block basis, and thus permit completion of the image processing of a picture near the same time that the codec engine has finished processing the picture, thereby providing reduced image processing latency compared to conventional techniques that rely on completion of the processing of the picture before starting the image processing of the picture.

FIG. 1 illustrates an example video system 100 implementing inline image processing in accordance with at least one embodiment of the present disclosure. In the depicted example, the video system 100 includes a video processing unit (VPU) 101 implementing an encoder/decoder (codec) engine 102 and an image processing module 104 coupled via a local path 106 of the VPU 101. The codec engine 102 and image processing module 104 each may be implemented entirely in hard-coded logic (that is, hardware), as a combination of software 108 stored in a non-transitory computer readable storage medium (e.g., an off-chip, or system, memory 110) and one or more processors to access and execute the software, or as combination of hard-coded logic and software-executed functionality with one or more processors.

To illustrate, in one embodiment, the video system 100 implements a the VPU 101 as system on a chip (SOC), multichip module (MCM), or other integrated circuit (IC) package 112 whereby portions of the codec engine 102 and image processing module 104 are implemented as hardware logic, and other portions are implemented via firmware (one embodiment of the software 108) stored at the IC package 112 and executed by one or more processors of the IC package 112. Such processors can include a central processing unit (CPU), a graphics processing unit (GPU), a microcontroller, a digital signal processor, a field programmable gate array, programmable logic device, state machine, logic circuitry, analog circuitry, digital circuitry, or any device that manipulates signals (analog and/or digital) based on operational instructions that are stored in the memory 110 or other non-transitory computer readable storage medium. To illustrate, the codec engine 102 and image processing module 104 may be implemented as, for example, a CPU executing video decoding software and image processing software.

The non-transitory computer readable storage medium storing such software can include, for example, a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The local path 106 comprises a signaling path within the VPU 101; that is, the local path 106 does not route through a component external to the IC package 112 of the VPU 101, such as the memory 110. In implementations whereby the codec engine 102 and the image processing module 104 are separate hardware components, the local path 106 can include, for example, an on-chip bus 114 directly coupling the codec engine 102 and the image processing module 104. Alternatively, the local path 106 can include an on-chip storage component 116 coupled to the codec engine 102 and the image processing module 104. This storage component 116 can include a register file, buffer, cache, and the like. For ease of illustration, an example implementation of the storage component 116 as a cache is described below, and thus the storage component 116 is also referred to below as "cache 116", and thus the term "cache" refers to any of a variety of storage structures used to temporarily store such data.

As a general operational overview, the codec engine 102 receives input video data 120 from a storage device or networked device and, depending on the implementation, encodes, decodes, or transcodes the input video data 120 to generate processed video data 122, which is then provided to a memory interface 124 of the VPU 101 for storage at the memory 110 or other external storage device. While in the process of encoding/decoding/transcoding the input video data 120, the codec engine 102 generates a stream 126 of pixel blocks (e.g., pixel blocks 128, 129, 130) for each picture of a sequence of pictures represented by the input video data. In an encoding implementation, each picture is received in unencoded form, and thus the codec engine 102 generates these pixel blocks for the picture by segmenting the picture into a set of pixel blocks and then processing the pixel blocks to generate the encoded video data. For example, the Motion Pictures Experts Group (MPEG) family of standards provides for a picture to be decomposed into a set of macroblocks, with each macroblock comprising, for example, 16×16 pixels from the picture. As such, each pixel block may be composed of a corresponding one of these macroblocks, as a partial or full row of these macroblocks, as a partial or full column of these macroblocks, as a tile of two or more macroblocks, and the like.

In a decoding implementation, the encoded video data (one embodiment of the input video data 120) includes sequences of intracoded frames (I frames), predictive coded frames (P frames), and bi-predictive coded frames (B frames). The I frames comprise complete picture information for a corresponding picture, and are represented as sets of pixel blocks. Accordingly, for I frames the codec engine 102 can generate the pixel blocks of the stream 126 for the corresponding picture while parsing the pixel blocks of an I frame representing the picture from the input video data 120. In other embodiments, the codec engine 102 generates the pixel blocks of the stream 126 for a picture after decoding a P frame or B frame that represents the picture. Thus, while FIG. 1 illustrates the stream 126 of pixel blocks being output to the memory interface 124 for storage at an external storage device, in some implementations the generation of the stream 126 of pixel blocks may be only an intermediate step in the processing performed by the codec engine 102 and thus the stream 126 of pixel blocks may not be output for external storage device, but rather an encoded or processed version of the image content represented by these pixel blocks may instead may be output for storage to an external storage device. As such, the cache 116 may comprise an internal buffer of the codec engine 102 used during an intermediary process, and which also may be accessed by the image processing module 104 to obtain copies of the pixel blocks stored therein.

As each pixel block of the stream 126 is generated for a picture, the codec engine 102 provides the pixel block to the image processing module 104 for processing via the local path 106. Depending on implementation, the pixel block may be provided directly between the codec engine 102 and the image processing module 104 via the on-chip bus 114 or the pixel block may be temporarily stored in the cache 116 before being accessed by the image processing module 104. In at least one embodiment, the image processing module 104 performs one or more image processing functions using one or more of the pixel blocks of the picture as they are received from the codec engine 102 via the local path 106. The results of the performance of the one or more image processing functions on the pixel blocks is provided as image processing result data 132, which may be stored locally (e.g., in the cache 116 or in a separate on-chip storage component) or provided to a storage interface 134 for storage in a storage component 136 external to the VPU 101, such as a hard disc drive, solid state drive, off-chip memory, and the like. In some embodiments, the storage component 136 comprises the memory 110. To illustrate, the image processing result data 132 for a picture may be stored with, or otherwise in association with, the corresponding processed video data 122 for the picture in the memory 110.

In some embodiments, the image processing function performed by the image processing module 104 comprises an image modification function and the image processing result data 132 therefore comprises a modified representation of the picture. To illustrate, the image modification function can include, for example, a scaling function whereby each pixel block of the picture is scaled as it is received from the codec engine 102, with the end result of producing a scaled version of the picture (one embodiment of the image processing result data 132). As another example, the picture may comprise an interlaced picture and the image modification function can include, for example, a deinterlacing function whereby each pixel block of the picture is deinterlaced with the end result of producing a deinterlaced version of the picture. Other examples include a rotate function to rotate each pixel block to generate a rotated version of the picture, a gamma correction function to generate a gamma corrected version of the picture, and the like. In other embodiments, the image processing function performed by the image processing module 104 comprises an image analysis function and the image processing result data 132 comprises image metadata representing one or more analyzed characteristics of the pixel blocks of the picture. For example, the image analysis function can include, for example, evaluation of the dominant color of each pixel block as it is received, and the image processing result data 132 therefore can include metadata comprising, for each pixel block of the picture, a value representing the dominant color of the pixel block. Similarly, the image analysis function can include a variance calculation to determine the variance (VAR) of each pixel block as it is received from the codec engine 102, and the resulting image processing result data 132 therefore can include metadata comprising, for each pixel block of the picture, a value representing the variance of the pixel block. As another example, the image analysis function can include a motion search or motion compensation process that determines a motion vector for a received pixel block of a picture relative to a previous picture in the sequence of pictures, and the resulting motion search data can be stored as image processing result data 132 for the picture. Another example image analysis function is a facial feature detection process that analyzes each pixel block as it is received to detect whether a facial feature is present, and the resulting facial feature metadata is stored as the image processing result data 132. An optical character recognition (OCR) process likewise can be performed and the resulting recognized character metadata stored as the image processing result data.

The image processing result data 132 may have any of a variety of applications. For example, gesture recognition metadata may be used by an application to identify certain gestures present in the video content of the processed video data 122, and process the video content accordingly, or the facial feature metadata may be used by an application to identify the presence of certain individuals in the video content of the processed video data. As another example, the scaled-down representation of a picture generated by the image processing module 104 may be stored with the picture in the memory 110, and accessed and used for scaled motion search (SMS) during an subsequent encoding of the picture, thereby avoiding the need to scale-down the picture for SMS during the encoding process as a scaled-down version is already available.

Figure 2:
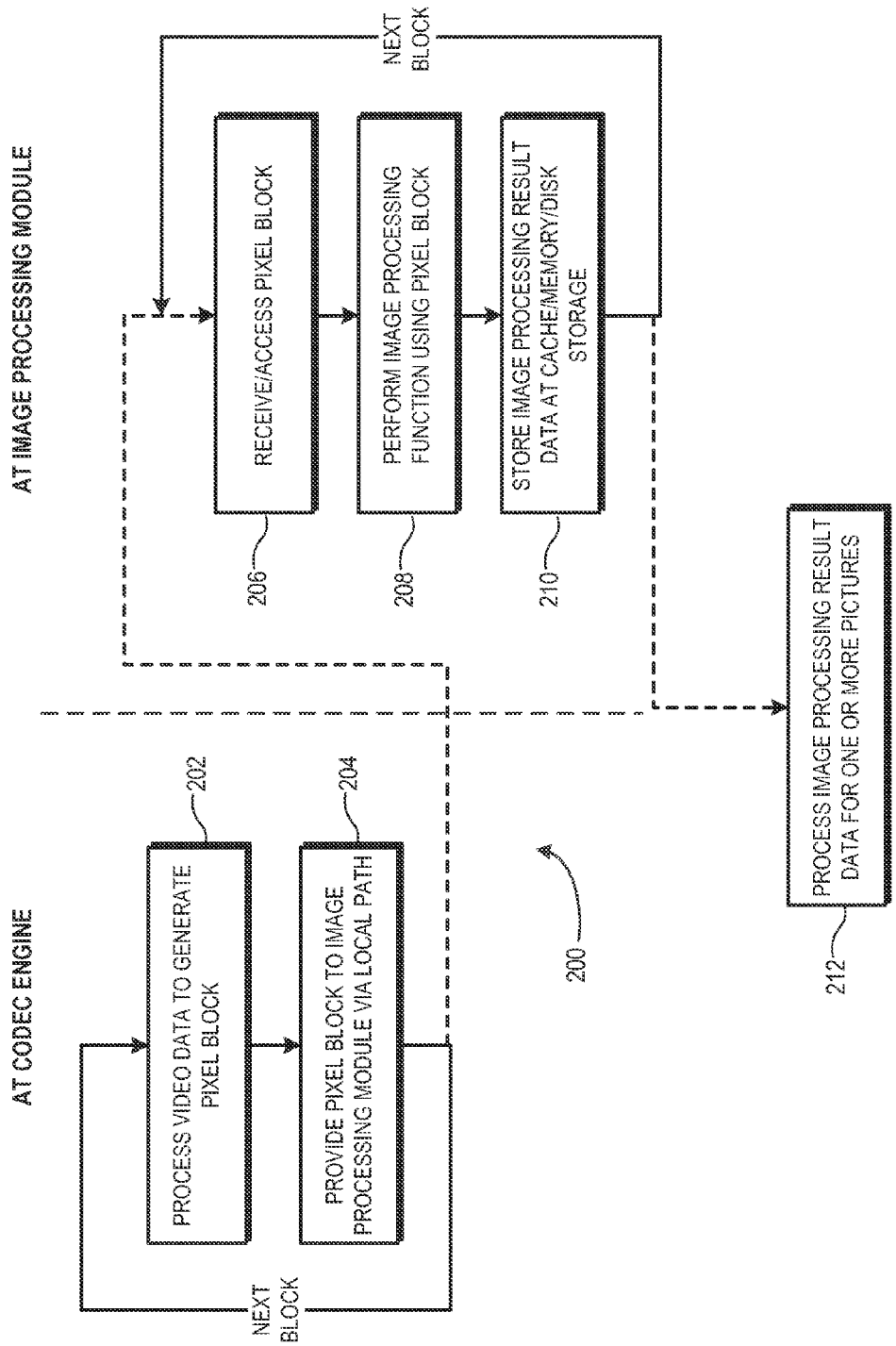
FIG. 2 is a flow diagram illustrating a method of providing inline image processing in accordance with at least one embodiment of the present disclosure.

FIG. 2 illustrates an example method 200 of inline image processing in the video system 100 of FIG. 1 in accordance with at least one embodiment of the present disclosure. As noted above, the video system 100 operates to encode/decode/transcode pictures of the input video data 120 to generate processed video data 122 for storage in the memory 110, while concurrently performing one or more image processing functions using the pixel blocks generated for the picture during the encoding/decoding/transcoding process. Method 200 illustrates this process for a single picture of the input video data 120, and thus the method 200 may be repeated for each picture of the sequence of pictures represented by the input video data 120.

The method 200 initiates with the codec engine 102 triggers an encoding/decoding/transcoding process for a picture of the input video data 120. As part of this process, at method block 202 the codec engine 102 generates a pixel block for the picture. The pixel block may be generated as a final product to be output from the codec engine 102 for storage at the memory 110 (e.g., as part of a decoded picture), or the pixel block may be generated as an intermediate step in the processing performed by the codec engine 102 (e.g., the segmentation of a picture to be encoded into a matrix of macroblocks). At method block 204, the codec engine 102 provides the pixel block to the image processing module 104 via the local path 106. As noted above, the provision of the pixel block can include direct transfer of a copy of the pixel block via the on-chip bus 114 or the temporary storage of the pixel block in the cache 116, whereupon a copy can be accessed by the image processing module 104. The process of method blocks 202 and 204 repeats for each pixel block generated by the codec engine 102, and then repeats for the next picture in the sequence.

In response to the provision of a pixel block, the image processing module 104, at method block 206 accesses or otherwise receives the provided pixel block. As noted above, the pixel block can be received via the on-chip bus 114, or the image processing module 104 can access the pixel block from the cache 116. At method block 208, the image processing module 104 performs an image processing function using the received pixel block to generate image processing result data 132 for the pixel block. As noted above, this image processing function can include an image modification function, such as a scaling, deinterlacing, or rotation function, and the resulting image processing result data 132 can comprise a modified version of the pixel block. In other embodiments, the image processing function can include an image analysis function, such as a motion search analysis, a feature recognition analysis, a dominant color analysis, a variance analysis, and the like, the resulting image processing result data 132 can comprise metadata representing the results of the analysis.

In some embodiments, the image processing function can be performed on each pixel block independently. In other embodiments, the image processing function may require processing a set of pixel blocks together or require comparison or analysis of the pixel block relative to one or more pixel blocks of a previous picture (e.g., for a motion search). In such cases, the image processing module 104 may use the cache 116 or a separate cache to buffer multiple pixel blocks for processing together.

At method block 210, the image processing module 104 provides the image processing result data 132 for the pixel block to the storage interface 134 for storage in the storage component 136. As noted above, the storage component 136 may comprise the memory 110, and thus the image processing result data 132 for a picture may be stored together with the processed video data 122 representing that picture. The process of method blocks 206, 208, and 210 may be repeated for the next pixel block provided by the codec engine 102 for the picture, and likewise may be repeated for the processing of the next picture of the sequence.

At some point, the image processing result data 132 generated for one or more pictures of the sequence is processed at method block 212 by the video system 100 or by another system. The processing performed using the image processing result data 132 depends on the form of the image processing result data 132. As noted above, the image processing result data 132 can include, for example, metadata identifying motion search information and thus be used for encoding the processed video data 122 or for gesture recognition in the video content of the processed video data 122. As another example, the image processing result data 132 may comprise facial feature metadata that may be used by an application to identify one or more individuals present in the video content, OCR metadata that may be used by an application to identify the textual context of one or more scenes of the video content, and the like.

As the description of method 200 above illustrates, there is tight integration between the codec engine 102 and the image processing module 104 in that as each pixel block is generated, it is quickly available to the image processing module 104 via the local path 106 for use in performing image processing functions. As encoding or decoding of a picture and the image processing of the picture proceed in parallel, the image processing is completed much earlier, and thus the image processing result data is available for use much earlier, than conventional systems that require completion of the processing of the picture by the codec engine and storage of the processed picture in external memory before beginning image processing of the picture. Moreover, by providing the pixel blocks via a local path that does not route through an external memory or otherwise route outside the video processing unit 101, the inline image processing technique of method 200 significantly reduces or eliminates considerable memory bandwidth consumption that otherwise would be required for the image processing of the picture.

Figure 3:
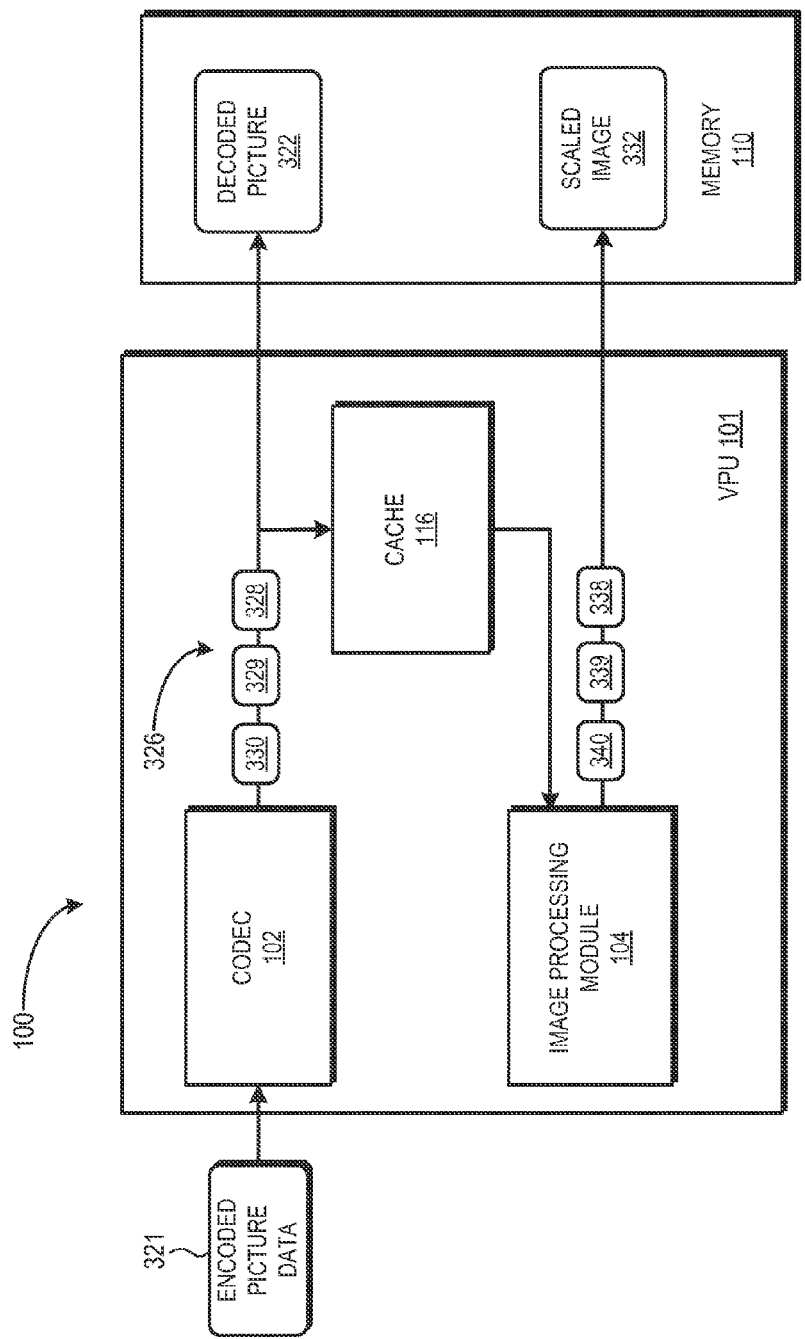
FIG. 3 is a block diagram illustrating an example of providing inline image processing of video data to generate image processing result data in the form of a modified representation of the video data in accordance with at least one embodiments of the present disclosure.
Figure 4:
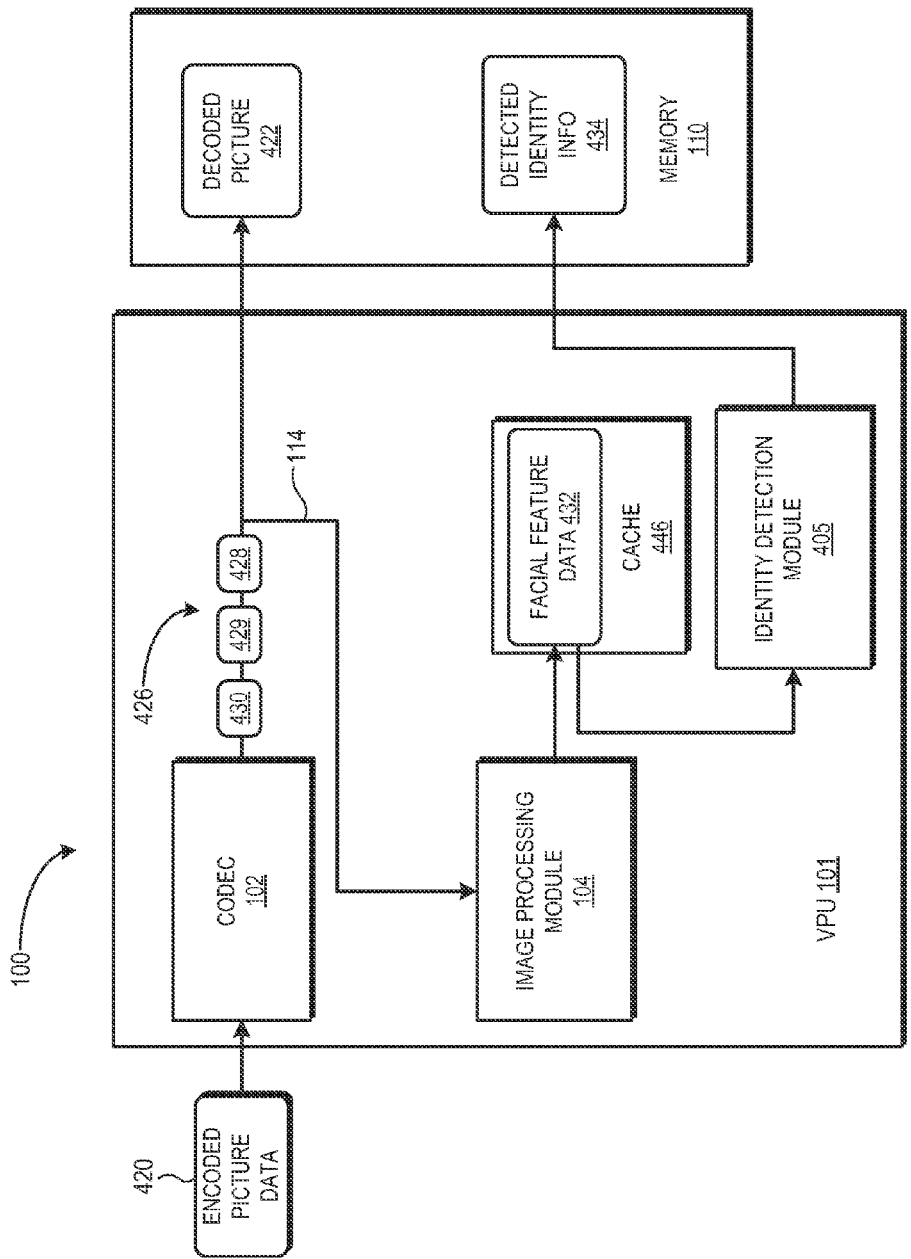
FIG. 4 is a block diagram illustrating an example of providing inline image processing of video data to generate image processing result data in the form of metadata representing analyzed characteristics of the video data in accordance with at least one embodiments of the present disclosure.

FIGS. 3 and 4 illustrate example implementations of the video system 100 using the method 200 in accordance with at least one embodiment of the present disclosure. Specifically, FIG. 3 illustrates an example implementation whereby the image processing module 104 implements a scaling function to generate scaled representations of pictures in the picture sequence represented by the input video data. Similar implementations may be used for other image processing functions that generate a modified version of the picture at issue, such as deinterlacing functions, gamma correction functions, picture rotation functions, and the like. In the depicted example of FIG. 3, encoded picture data 320 (one embodiment of the input video data 120, FIG. 1) is received by the codec engine 102 and decoded by the codec engine 102 to generate a decoded picture 322 (one embodiment of processed video data 122, FIG. 1) that is stored in the memory 110. As part of the decoding process, the codec engine 102 generates a stream 326 of pixel blocks for the picture (e.g., pixel blocks 328, 329, 330), and as each pixel block is generated by the codec engine 102, it is stored in the cache 116. The image processing module 104 then accesses each pixel block from the cache 116 in turn, and scales the pixel block to generate a scaled pixel block (e.g., scaled pixel blocks 338, 339, 340 corresponding to pixel blocks 328, 329, and 330), which is stored with the other scaled pixel blocks similarly generated for the other pixel blocks of the pixel as a scaled image 332 (one embodiment of the image processing result data 132, FIG. 1) in the memory 110. Thus, as demonstrated by this example, a scaled (up-scaled or downscaled) version of a decoded picture can be created and completed nearly simultaneously with the completion of the decoding of the picture, and in a manner that does not require accessing an external memory during the scaling process.

FIG. 4 illustrates an example implementation whereby the image processing module 104 implements a facial feature detection function to generate facial feature metadata for each picture in the picture sequence represented by input video data. Similar implementations may be used for other image analysis functions that generate metadata representing one or more characteristics identified in the picture at issue, such as motion detection functions (e.g., for subsequent gesture recognition applications), dominant color analysis, variance analysis, vectorization, and the like. In the depicted example of FIG. 4, encoded picture data 420 (one embodiment of the input video data 120, FIG. 1) is received by the codec engine 102 and decoded by the codec engine 102 to generate a decoded picture 422 (one embodiment of processed video data 122, FIG. 1) that is stored in the memory 110. As part of the decoding process, the codec engine 102 generates a stream 426 of pixel blocks for the picture (e.g., pixel blocks 428, 429, 430), and as each pixel block is generated by the codec engine 102, a copy is provided to the image processing module 104 via the on-chip bus 114. Upon receipt of an pixel block from the codec engine 102, the image processing module 104 analyzes the pixel block to detect whether any facial features are present in the pixel block using any of a variety of well-known facial feature detection algorithms, and generates facial feature metadata 432 (one embodiment of the image processing result data 132, FIG. 1) representing the characteristics of facial features, if any, detected in the pixel block. In the depicted example, the image processing module 104 stores the facial feature metadata 432 in a separate on-chip cache 446, which is also accessible by a facial detection module 405.

As facial feature metadata 432 for a picture is stored to the cache 446, the facial detection module 405 compares the facial features represented in this metadata to corresponding facial features in an identity database (not shown) that contains facial feature descriptions for a set of persons of interest. In the event that a sufficient match is found between facial features identified in the picture and a corresponding person, the facial detection module 405 generates detected identity information 434 pertaining to the identified person and an identifier of the picture(s) in which the identified person appears in the picture sequence (e.g., using timestamps) and stores this information in the memory 110. The detected identify information 434 then may be used, for example, by law enforcement to identify persons of interest in the recorded video represented by the encoded picture data 420, or to permit rapid identification of the appearance times of certain persons within the video content.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A video device comprising:
a die implementing:
    a codec engine to process video data to generate a stream of pixel blocks during transcoding of the video data by the codec engine, the stream of pixel blocks representing a picture of a sequence of pictures represented by the video data; and
    an image processing module to receive the stream of pixel blocks via a local path of the die between the codec engine and the image processing module and to perform at least one image analysis function using pixel blocks of the stream of pixel blocks received via the local path to generate image metadata describing one or more analyzed characteristics of the picture, wherein the image processing module performs the at least one image analysis function in parallel with the codec engine generating the stream of pixel blocks; and
a storage interface coupleable to a storage component, the storage interface to provide the image metadata for storage at the storage component.

2. The video device of claim 1, wherein the local path comprises:
a first cache having an input coupled to an output of the codec engine and an output coupled to the image processing module, the first cache to temporarily store a subset of pixel blocks of the stream of pixel blocks.

3. The video device of claim 1, wherein the local path comprises:
an on-chip bus connecting the codec engine and the image processing module.

4. The video device of claim 1, further comprising:
a memory interface coupleable to a memory external to the die, the memory interface to provide the stream of pixel blocks for storage at the memory.

5. The video device of claim 4, wherein:
the storage component comprises the memory external to the die.

6. A method comprising:
processing video data at a codec engine of a die of a video device to generate a stream of pixel blocks during transcoding of the video data, the stream of pixel blocks representing a picture of a sequence of pictures represented by the video data;
providing the stream of pixel blocks to an image processing module of the die of the video device via a local path of the die between the codec engine and the image processing module;
performing an image analysis function at the image processing module using pixel blocks received via the local path to generate image metadata describing one or more analyzed characteristics of the picture, wherein the image processing module performs the image analysis function in parallel with the codec engine generating the stream of pixel blocks; and
storing the image metadata at a storage component.

7. The method of claim 6, further comprising:
storing the stream of pixel blocks at the storage component in association with the image metadata.

8. The method of claim 6, wherein providing the stream of pixel blocks to the image processing module via a local path comprises one of: temporarily storing pixel blocks of the stream at a cache accessible by the image processing module; and providing the stream of pixel blocks to the image processing module via an on-chip bus connecting the codec engine and the image processing module.

* * * * *